United States Patent [19]

Goebel

[11] Patent Number: 4,618,300
[45] Date of Patent: Oct. 21, 1986

[54] QUICK-CLAMPING NUT FOR USE WITH A THREADED MEMBER

[76] Inventor: Eickhart Goebel, Elbestr. 11, 6102 Pfungstadt, Fed. Rep. of Germany

[21] Appl. No.: 648,314

[22] Filed: Sep. 7, 1984

[30] Foreign Application Priority Data

Sep. 8, 1983 [DE] Fed. Rep. of Germany ... 8325783[U]

[51] Int. Cl.$^4$ ............................................. F16B 37/08
[52] U.S. Cl. .................................... 411/433; 411/435; 73/487
[58] Field of Search ................................ 411/432–434; 269/173, 174, 176, 177; 73/487, 460

[56] References Cited

U.S. PATENT DOCUMENTS

| 351,474 | 10/1886 | Stevens et al. | 411/433 |
| 747,270 | 12/1903 | Taylor | 411/433 |
| 3,797,336 | 3/1974 | Howe | 411/434 |
| 4,332,169 | 6/1982 | Stuart | 411/433 |
| 4,336,717 | 6/1982 | Goebel | 73/487 |

FOREIGN PATENT DOCUMENTS 7814610 10/1978 Fed. Rep. of Germany .
2492019 4/1982 France ............................... 411/433

OTHER PUBLICATIONS

"Universal Clamping Adapter," published by Hofmann Werkstatt-Technik GmbH, Aug. 1980.

Primary Examiner—Gary L. Smith
Assistant Examiner—Neill Wilson
Attorney, Agent, or Firm—Fleit, Jacobson, Cohn & Price

[57] ABSTRACT

A quick-clamping nut for permitting rapid engagement with an externally threaded member, such as a bolt, with a minimum of turning to lock a first member to a second member, the second member carrying the threaded bolt. The nut includes a tubular housing having a pair of elongated, similarly configured segments carried therewithin, the segments each including outer ends having an internal thread formed therein. The elongated segments also include outwardly facing tapered surfaces, and inner ends that are secured to the tubular housing and that carry biasing means to urge apart the outer ends of the segments. A clamping cone is provided having a through bore and an outer surface adapted for engagement with the first member, an inner tapered surface for cooperative engagement with the outwardly facing tapered surfaces of the elongated segments so that axial movement of the elongated segments into the clamping cone operates to urge the threaded ends of the elongated segments inwardly toward each other to engage the internal threads therein with external threads on a threaded member. Inward movement of the threaded ends of the elongated segments is limited by an annular shoulder that is carried by the clamping cone to engage with the inner surfaces of the threaded segments and thereby limit the inward movement thereof to prevent binding of the interengaged threads.

3 Claims, 1 Drawing Figure 4,618,300

QUICK-CLAMPING NUT FOR USE WITH A THREADED MEMBER

BACKGROUND OF THE INVENTION

This invention relates to a quick-clamping nut and more particularly to a quick-clamping nut that can be used to rapidly attach and detach an automobile wheel to and from a wheel balancing machine.

DESCRIPTION OF THE PRIOR ART

The publication entitled, "Universal Clamping Adapter", dated August 1980, and published by Hofmann Werkstatt Technik GmbH, the disclosure of which is hereby incorporated herein by reference, illustrates how a wheel clamping flange is mounted to the main shaft of a wheel balancing machine in which sliding bolts are adjusted to the pitch circle diameter of the automobile wheel to be clamped and balanced. After being positioned on the flange, the wheel is clamped by means of nuts, usually by means of the same wheel nuts that are used to mount the wheel on the automobile. The disadvantage of this known device is that both the tightening and untightening of the wheel to the balancing machine, by means of threading and unthreading the wheel nuts onto the sliding bolts, takes an excessive amount of time, the amount of time depending upon the length of the bolts, so that the overall time to conduct the balancing process is unnecessarily extended.

Quick-clamping nuts which consist of several threaded segments and which are received in a clamping cone are known. A disadvantage of these known quick-clamping nuts is that the threaded segments can become so tightly compressed against the bolt thread by the clamping cone that they become jammed on the external thread of the sliding bolts, or they can only be turned with great difficulty.

It is an object of the present invention to avoid the disadvantages of the hitherto known devices and to provide a quick-clamping nut that is easy to handle in any position and that can be quickly and easily attached to and detached from a bolt.

SUMMARY OF THE INVENTION

Briefly stated, in accordance with one aspect of the present invention, a quick-clamping nut is provided for attachment to an externally threaded member and for engagement therewith with a minimum amount of turning effort to lock a first member to a second member, the second member carrying the threaded member. The nut includes a tubular housing, a pair of elongated, similarly configured segments carried within the housing, the elongated segments each including outer ends having an internal thread formed therein, an outwardly facing tapered surface, and including inner ends secured to the housing and carrying biasing means to urge the outer ends apart. A clamping cone is provided having a through bore, an outer surface adapted for engagement with the first member, an inner tapered surface for co-operative engagement with the outwardly facing tapered surfaces of the elongated segments so that axial movement of the elongated segments into the clamping cone operates to cause the tapered surfaces to come into contact and to urge the outer ends of the elongated segments inwardly toward each other to engage the internal threads therein with the externally threaded member. Limiting means are provided on the clamping cone for limiting the inward movement of the elongated segments toward each other.

DESCRIPTION OF THE PREFERRED EMBODIMENT

Figure 1:
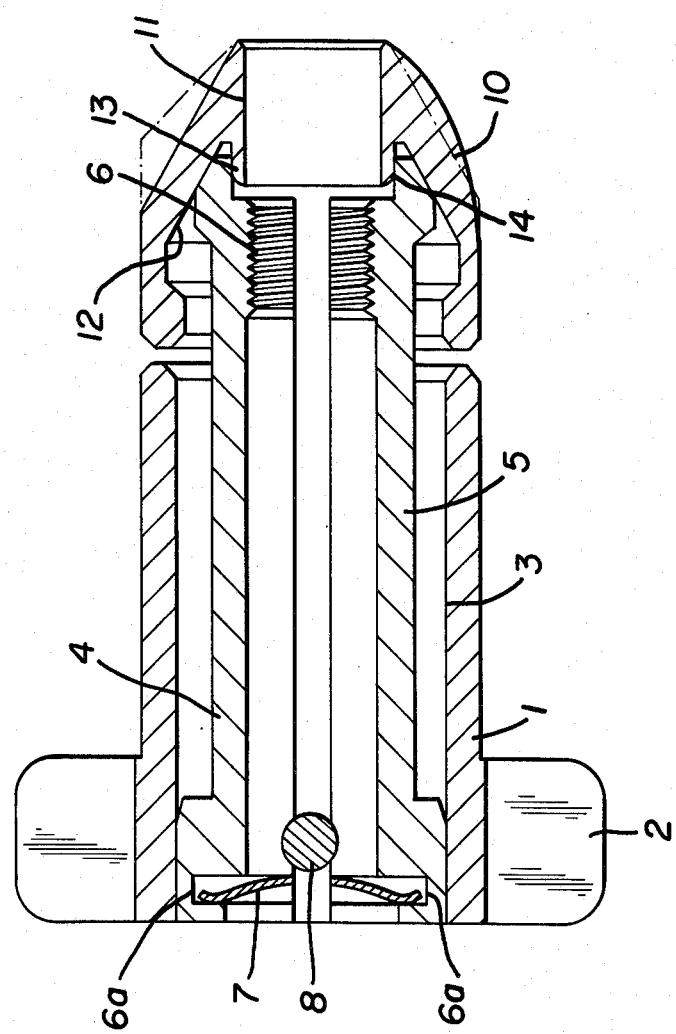
FIG. 1 is a cross-sectional view of a quick-clamping nut in accordance with the present invention.

Referring now to the drawing, the quick-clamping nut has a tubular body 1 that at one end includes a wing-like clamping handle 2. An inner bore 3 is provided in the tubular body 1 in order to accommodate therein a pair of centrally arranged, threaded elongated segments 4 and 5. Preferably, two threaded segments are provided to define a split inner sleeve, the respective segments each having an internal thread 6 formed adjacent the open end of tubular body 1 opposite to the end that carries clamping handle 2. As illustrated in FIG. 1, thread 6 is provided on only a part of the inner surface of each of segments 4 and 5 and the outer ends of each of threaded segments 4 and 5 adjacent the threaded portions 6 are tapered.

The respective ends of threaded segments 4 and 5 opposite the ends in which threads 6 are formed include annular slots 6a formed on the inner surfaces thereof to receive a biasing means, such as disc-like spring 7, that serves to urge the threaded portions 6 apart from each other by providing a pivoting force tending to pivot the threaded segments about a cylindrical pin 8 that extends through and between the threaded segments. Cylindrical pin 8 is securely received in a pair of opposed apertures in cylindrical body 1 so that the threaded segments 4 and 5 rotate together with the rotation of cylindrical body 1.

A tubular clamping cone 10 is provided and the outer end surface of the clamping cone 10 facing a clamping flange, not shown, forming, for example, part of a wheel balancing machine, and engaging the stud openings in the automobile wheel, can be of tapered or of spherical shape, as illustrated in FIG. 1. The taper can be, for example, at an inclination of 60° or 90° relative to the axis of the clamping cone, and the clamping cone will serve to center the automobile wheel relative to the clamping flange by means of the stud openings in the wheel. The clamping cone 10 has a through bore 11 slightly greater in diameter than the outer diameter of the theads on the bolt to which the nut is to be secured, and an inner recess 12 which is of tapered shape and tapers in the same direction as the outer end of the threaded segments 4 and 5. Recess 12 is undercut relative to the bore 11 so that an annular shoulder 13 is provided inside the clamping cone 10. An inner recess 14 in the form of a counter bore is provided at the threaded ends of segments 4 and 5 and is adapted to overlie annular shoulder 13.

In operation, and as applied to a wheel balancing machine, the clamping cone 10 is positioned over the threaded segments 4 and 5 with the respective tapered surfaces on threaded segments 4 and 5 and on clamping cone 10 in contact and at their outermost position relative to the longitudinal axis of cylindrical body 1. The quick-clamping nut is then placed on the bolt of the clamping flange until the outer surface of clamping cone 10 engages with the stud opening of the wheel. Spring 7 initially urges the ends carrying thread 6 apart so that the nut can be quickly slipped over the bolt and axially moved therealong until the outer tapered surface of the clamping cone is against the stud opening. Axial pressure is then applied to cylindrical body 1 and the threaded segments 4 and 5 move radially inwardly toward each other and along the inclined recess 12, and internal threads 6 finally engage the external thread of the sliding bolt. Final clamping of the wheel to the clamping flange is accomplished by turning the quick-clamping nut to urge the clamping cone 10 tightly against the automobile wheel.

Annular shoulder 13 of clamping cone 10 is engaged by inner recesses 14 in threaded segments 4 and 5, and the inward movement of threaded segments 4 and 5 toward each other is therefore limited by shoulder 13 that defines a stop to insure that the internal threads 6 will not be excessively tightly engaged with the external thread on the stud, and will not become jammed when tightened, but remain easily movable in either direction of rotation of the nut, regardless of the amount of axial force exerted on the clamping cone.

Although particular embodiments of the present invention have been illustrated and described, it will be apparent to those skilled in the art that various changes and modifications can be made without departing from the spirit and scope of the present invention, and it is intended to encompass within the appended claims all such changes and modifications that fall within the scope of the present invention.

What is claimed is:

1. A quick-clamping nut for engaging an externally threaded member for engagement therewith with a minimum of turning to lock a first member to a second member, the second member carrying the threaded member, said nut comprising:
    (a) a tubular housing having an inner bore and including external turning means, said housing including a pair of opposed apertures adjacent an end thereof defining a pivot axis;
    (b) a pair of elongated, similarly configured segments carried within said housing and pivotable about said pivot axis, said elongated segments each including outer ends having an internal thread formed therein and having an outwardly facing tapered surface, and including inner ends contacting said inner bore of said housing and carrying biasing means to urge the outer ends apart;
    (c) a pivot pin extending transversely across said inner bore of said housing and securely received in said opposed apertures to define a pivot surface about which said elongated segments pivot, said pin extending between and contacting said elongated segments to cause said segments to rotate with said housing; and
    (d) a clamping cone having a through bore, an outer surface adapted for engagement with the first member, an inner tapered surface for cooperative engagement with the outwardly facing tapered surfaces of said elongated segments so that axial movement of said elongated segments into said clamping cone operates to cause the tapered surfaces to come into contact and to urge the outermost ends of said elongated segments inwardly toward each other to engage the internal threads therein with the externally threaded member, and limiting means carried by said clamping cone for limiting the inward movement of said elongated segments toward each other.

2. A quick-clamping nut as set forth in claim 1 wherein said limiting means comprises an annular shoulder carried by said clamping cone, said shoulder cooperating with the inner surfaces of said elongated members adjacent said threaded portions to limit the inward movement thereof.

3. A quick-clamping nut as set forth in claim 2 wherein said elongated segments each include an annular recess adjacent to and outwardly of the threaded portions thereof, said annular recesses together defining a counterbore that is engageable with said annular shoulder to limit inward movement of the threaded ends of said elongated members toward each other.

* * * * *